3,023,156
COATING COMPOSITION CONTAINING PARAFFIN WAXES AND MICROCRYSTALLINE WAXES
John Podlipnik, Palos Heights, Ill., assignor to Sinclair Refining Company, New York, N.Y., a corporation of Maine
No Drawing. Filed May 22, 1957, Ser. No. 660,752
2 Claims. (Cl. 208—21)

This invention relates to a new wax composition particularly useful in the manufacture of a wax-coated paperboard container.

It is established practice in the dairy industry to use paraffin waxes to coat paperboard containers useful, for example, in the packaging of milk. However, notwithstanding the numerous advantages of the paperboard container, wider acceptance is inhibited due to various difficulties frequently encountered resulting from poor characteristics of wax-coated containers. For example, use of the present-day paperboard coating paraffin waxes is attended by one or more of these undesirable features: (a) poor coverage resulting in leaky containers, (b) abnormal bulge of the containers resulting in loss of efficiency of packing, transporting, and storage of containers, (c) a "serpentine" or "ripple" effect giving rise to areas of no or little wax which are subject to absorption and attack by the contents, (d) brittleness, poor adhesion and unsatisfactory tensile strength, resulting in wax flaking and cracking and (e) poor appearance due to discoloration and lack of smoothness.

Many attempts to overcome certain difficulties attendant with the wax-coated paperboard containers have been defeated as the solutions devised create additional or adverse effects upon other important physical and functional properties. Moreover, steps which can be taken to avoid undesirable properties are sometimes prohibited by economics dictating the necessary limits to the permissible cost of the coatings. I have discovered a wax composition containing a plurality of wax components of defined properties which when combined in particular proportions provide a highly superior product suitable for use as air-cooled coatings on paperboard containers. Each component of my composition makes its contribution to the end product in such a way that it does not unduly adversely affect physical and functional properties fundamentally contributed by the other components and is apparently able to do so because of its particular properties, defined concentrations and the relationship it holds to the combination of all the components.

The novel wax composition of my invention is comprised essentially of about 65 to 91 volume percent paraffin wax, about 5 to 25 volume percent non-normal paraffin wax, about 3 to 10 volume percent microcrystalline wax and about 0.25 to 2 volume percent tank bottoms microcrystalline wax. This composition can be applied to paperboard containers which are dipped into a melt of the wax, for instance maintained at a temperature of about 155 to 190° F. The coated containers are withdrawn from the vat of melted wax and then cooled by contact with a flowing gas stream, e.g. such as air, preferably at a temperature of about 40 to 60° F. Paperboard presently employed in the packaging industry such as sized and calendered paperboard produced by the Fourdrinier process and having a low moisture content, i.e. about 5 percent, can be used as the base material for the wax coating.

The paraffin wax component is the base wax of my composition as it comprises about 65 to 91 percent of the blend and is preferably a fully refined paraffin wax, i.e. essentially tasteless and odorless and contains a maximum of about 0.5 percent oil (ASTM D 721–55T). The paraffin wax has a melting point (ASTM D 87–42) in the range of about 122 to 132° F., and preferably has a viscosity (ASTM D 445–53T) at 175° F. of about 4 to 6 centistokes and an NPA color (ASTM D 155–45T) maximum of 1. In general, waxes which may be employed as the paraffin wax component of my composition are the essentially straight chained crystalline paraffins obtained from paraffin base crude petroleum oils such as Pennsylvania and mixed base crudes, preferably the latter. As noted, the melting point of this base wax is in the range of about 122 to 132° F., and the use of other paraffin waxes, e.g. the 135/137 to 160/165° F. melting point grade waxes has not given the properties obtainable with my designated crystalline waxes when blended with the other three wax components of the composition.

The non-normal paraffin wax component of my composition is a flexible, low melting point, non-normal paraffin-type wax present, for instance, in heavy lube distillate slack wax. This wax can be obtained by conventional solvent deoiling of a foots oil fraction obtained during the solvent deoiling of a heavy lube distillate slack wax for the production of higher melting point paraffin waxes. The foots oil wax thus obtained is characterized by a high viscosity for its low melting point, a soft and pliable nature and an exceptionally low temperature flexibility. Listed below are the approximate requirements which are met by the non-normal paraffin wax to be satisfactory for use in the composition of the present invention.

Melting point, ASTM D 87–42_____ 105–120° F.
Viscosity at 175° F., centistokes ASTM
  D 445–52T_____ 6.0–10.0.
Oil content, ASTM D 721–53T_____ 2.0 max.
Refractive index at 70° F_____ 1.4375 min.

In a given refinery operation this wax component may be obtained in combination with another component of my composition, and this combination could be used in the present invention should it be possible to provide its separate components in the proper amounts. The concentration of the non-normal paraffin wax component in the novel wax composition is limited to between about 5 and 25 percent. Addition of higher percentages would unduly soften the wax and cause undesirable sticking of slabs of wax in hot weather while concentrations of less than 5 percent are ineffective.

The microcrystalline petroleum wax component of my composition can be prepared by conventional solvent deoiling of petrolatum from a Mid-Continent crude oil or a Pennsylvania crude oil. In order to give acceptable performance the microcrystalline wax must have the following approximate properties:

Melting point, ASTM D 127–49_____ 130–185° F.
Penetration at 77° F., 100 gm. needle
  (ASTM D 5–25)_____ 20–50.
Viscosity, SSU at 210° F. (ASTM D
  446–39) _____ 100 max.

Maximum concentration of this component is limited to about 10 volume percent since higher concentrations lead to excessive consumption and foaming tendencies during the coating of cartons. Concentrations of less than about 3 volume percent are ineffective.

My composition is particularly desirable as it markedly decreases the tendency to obtain a ripple or serpentine effect when coating paperboard cartons by dipping and then cooling in a flowing gas stream. This rippling and unevenness leads to areas of no or little wax and consequently to excessive bulging, increased susceptibility to attack by the contents and greater water absorption. Inclusion of about 0.25 to 2.0 percent tank bottoms microcrystalline wax, preferably at least about 0.5 percent, substantially eliminates the rippled coating, markedly improving the coverage and appearance of the wax-coated paperboard carton. The tank bottoms microcrystalline wax component of my invention is a hard, high melting point wax refined from material which settles out of crude oil during storage. A number of different grades are currently marketed but those having the following approximate properties will give the desired results:

Melting point (ASTM 127-49) _____ ° F__ 180-200
Penetration at 77° F., 100 gms. (ASTM D 5-25) _____ 2-12
Viscosity, SSU at 210° F. (ASTM D 446-39) __ 60-90

Preferably, this wax component has a maximum color, NPA (ASTM D 155-45T) of about 3. Thus, although bleached grades of the tank bottoms wax are preferred, unbleached grades whose properties meet all of the above requirements except as to color are also suitable. When the unbleached tank bottoms wax is employed, it can be added to the other wax components and the blend then bleached if a product of lesser color is desired.

Maximum concentration of the tank bottoms wax in my composition is limited to about 2.0 percent since higher concentrations would undesirably embrittle the wax. Concentrations below 0.25 percent are ineffective. Highly preferred, however, is a concentration of the tank bottoms wax of around 0.75 percent in order to reduce the ripple effect to the greatest extent.

The invention will be further illustrated by the following specific example.

90.25 parts by volume of a fully refined paraffin wax obtained from a Mid-Continent crude and having a 125/127° F. melting point and a viscosity of 4.75 cs. at 175° F., are heated to 175° F. 5 parts by volume of foots oil wax, 115/117° F., melting point, 1.4424 refractive index at 70° F., oil content 1.01, and 8.67 cs. viscosity at 175° F., were added and stirred into the melted paraffin wax. The relatively high refractive index of the foots oil wax at its low melting point indicates the presence of substantial non-normal paraffins. 4 parts by volume of petroleum microcrystalline wax, melting point 167° F., penetration 100 gm. needle at 77° F. 25, viscosity 89 SSU at 210° F. were heated to 190° F. and stirred into the combined paraffin and foots oil waxes maintained at 175° F. 0.75 part by volume of Crown 500 tank bottoms microcrystalline wax, melting point 197.5, penetration 100 gm. needle at 77° F. 7, and viscosity 75 SSU at 210° F. were heated to 220° F. and then stirred into the mixture of the other three wax components maintained at 175° F. The blend of the four wax components was allowed to cool to ambient temperature.

The wax composition obtained had the following properties:

Melting point, ° F. ASTM 87-42 _____ 125.1
Viscosity, cs. 175° F_____ 5.420
Percent oil_____ 0.49
Saybolt color_____ +20
Odor and taste_____ OK
Penetration at 77° F_____ 17
Penetration at 90° F_____ 42

The wax blend was placed in a dipping vat maintained at a temperature of 175° F., to insure complete melting and proper fluidity of the mix. An unwaxed preformed paperboard quart container characterized by a 5 weight percent moisture content was dipped in the wax vat and held there for about 10 seconds to insure complete coating for the container. The coated container was removed from the vat and air-cooled in flowing air at about 50° F. After 42 seconds at 50° F., the wax had set sufficiently for testing purposes. The finished carton was subjected to tests in accordance with the various procedures outlined below.

Visual observation demonstrated that wax-coated containers produced in accordance with my composition had smooth, uniform, and complete coatings on all types of paperboard base materials tested. The following is a tabulation of the characteristics of the container (A) made in accordance with the procedure of the example above and those of wax-coated cartons (B, C and D) presently in use in the milk industry.

*Table*

| Property | Carton A | Carton B | Carton C | Carton D |
|---|---|---|---|---|
| Wax consumption | 34.1 | 34.5 | 34.4 | 34.9. |
| Wax coverage | Excellent | Fair-good | Very good | Good. |
| Lactic acid test (3 days at 45° F.): | | | | |
| Absorption lbs./1,000 cartons. | 3.79 | 4.79 | 5.52 | 5.66. |
| Bulge, 32nds. of an inch. | 7 | 7.5 | 7.2 | 7.4. |
| Resistance to cracking and flaking at 45° F. | Good | Good | Poor | Poor. |
| Gloss of coated cartons. | Good | Good | Poor | Poor. |
| Serpentine coating. | No | Yes | Yes | Yes. |

The lactic acid test consists of filling a wax cooled container with a 1 percent lactic acid solution which may also contain methylene blue dye. The container is stored at 45° F. for 72 hours and at the end of this period emptied and the weight gained measured. The gain in weight is a measure of absorption of solution into the paperboard and can be correlated with completeness of coverage. The gain in weight is reported in pounds per 1000 cartons. After the cartons are weighed they are cut open and examined for presence of blue dyed spots. These spots occur wherever the paperboard is not covered with wax, and therefore their presence is a measure of completeness of coverage. The low absorption of acid by containers prepared in accordance with my invention along with the appearance of fewer blue dyed spots shows my container was superior to commercial containers.

The "bulge" measurement consists in measuring with a caliper the deviation of the container side during use from its normal plane. Acceptable commercial specifications establish a limit of permissible bulges of 8.0 (max.) at 45° F. Although the data in the table show all container tests as meeting the standard commercial specifications, the bulge measurement of the container of my invention is seen to be superior to the others.

After dropping to get leaking on all corners of the carton resistance to cracking and flaking is determined by visual examination of the bottom of the container at 45° F. It should be pointed out that the commercial carton exhibiting equal resistance to flaking and cracking is inferior to the container of the invention as regards wax coverage and consumption. Moreover, my carton was the only one on which the serpentine or ripple effect was not obtained.

Until my present invention it has been necessary to add polyethylene to wax compositions to obtain coatings having the characteristics of mine. The use of polyethylene has its disadvantages. At the concentrations required to obtain desired coating properties, polyethylene is incompatible in paraffin wax at temperatures below 160° F. Thus, to keep the polyethylene wax blend uniform when stored in the liquid state, it is necessary to either keep the storage temperature above 160° F. or agitate the blend if lower temperatures are used. Use of higher temperatures leads to oxidation problems, and agitation requires expensive mixing equipment. Storage properties of my new composition are such that no agitation is required at normal storage temperatures of 145 to 160° F. Also, the manufacture of a polyethylene blended wax requires special mixing equipment to obtain a uniform product while my composition is made without difficulty using conventional blending equipment. Milk cartons coated with polyethylene blended waxes have an undesirable mottled or stained appearance and this does not occur with the composition of the present invention. Difficulty is encountered in obtaining a leak proof top seal on cartons coated with waxes containing polyethylene due to the relatively high softening point of such blends. My new composition is readily melted, and top seal problems attributable to the wax are not experienced. No unusual operating conditions are required in using my composition whereas successful coating of polyethylene blends is dependent on using conditions falling within a narrow range, and in a number of instances the narrow operating range has precluded use of polyethylene blended waxes since machine operators were unable to hold conditions within the specified range.

Thus, it is seen that my compositions provide gas or air-cooled coatings for paperboard cartons of excellent properties and appearance. The coatings have good characteristics with respect to flexibility, durability, hardness, coverage, resistance to bulging, cracking and flaking, and absence of ripples. Moreover, my composition is readily applied to paperboard containers with present equipment without undue foaming or wax consumption.

I claim:

1. A wax composition consisting essentially of about 65 to 91 volume percent of paraffin wax, melting point in the range of 122 to 132° F., viscosity at 175° F. of about 4 to 6 centistokes, and having a maximum of 0.5% oil; about 5 to 25 volume percent of non-normal paraffin wax, melting point in the range of 105 to 120° F., viscosity at 175° F., of 6 to 10 centistokes, maximum of 2.0 percent oil, and refractive index at 70° F. of 1.4375 minimum; about 3 to 10 volume percent of microcrystalline wax, melting point in the range of 130 to 185° F., penetration at 77° F., 100 g. needle of 20 to 50, and viscosity SSU at 210° F. of 100 maximum; and about 0.25 to 2.0 volume percent of tank bottoms microcrystalline wax, melting point in the range of 180 to 200° F., penetration at 77° F., 100 g. needle of 2 to 12, and viscosity at 210° F. of 60 to 90.

2. A paperboard container coated with the composition of claim 1.

References Cited in the file of this patent

UNITED STATES PATENTS

| | | |
|---|---|---|
| 2,668,866 | Good | Feb. 9, 1954 |
| 2,753,275 | Wiles | July 3, 1956 |
| 2,758,100 | Bailly et al. | Aug. 7, 1956 |
| 2,885,340 | Tench | May 5, 1959 |
| 2,885,341 | Tench | May 5, 1959 |